Figure 1:
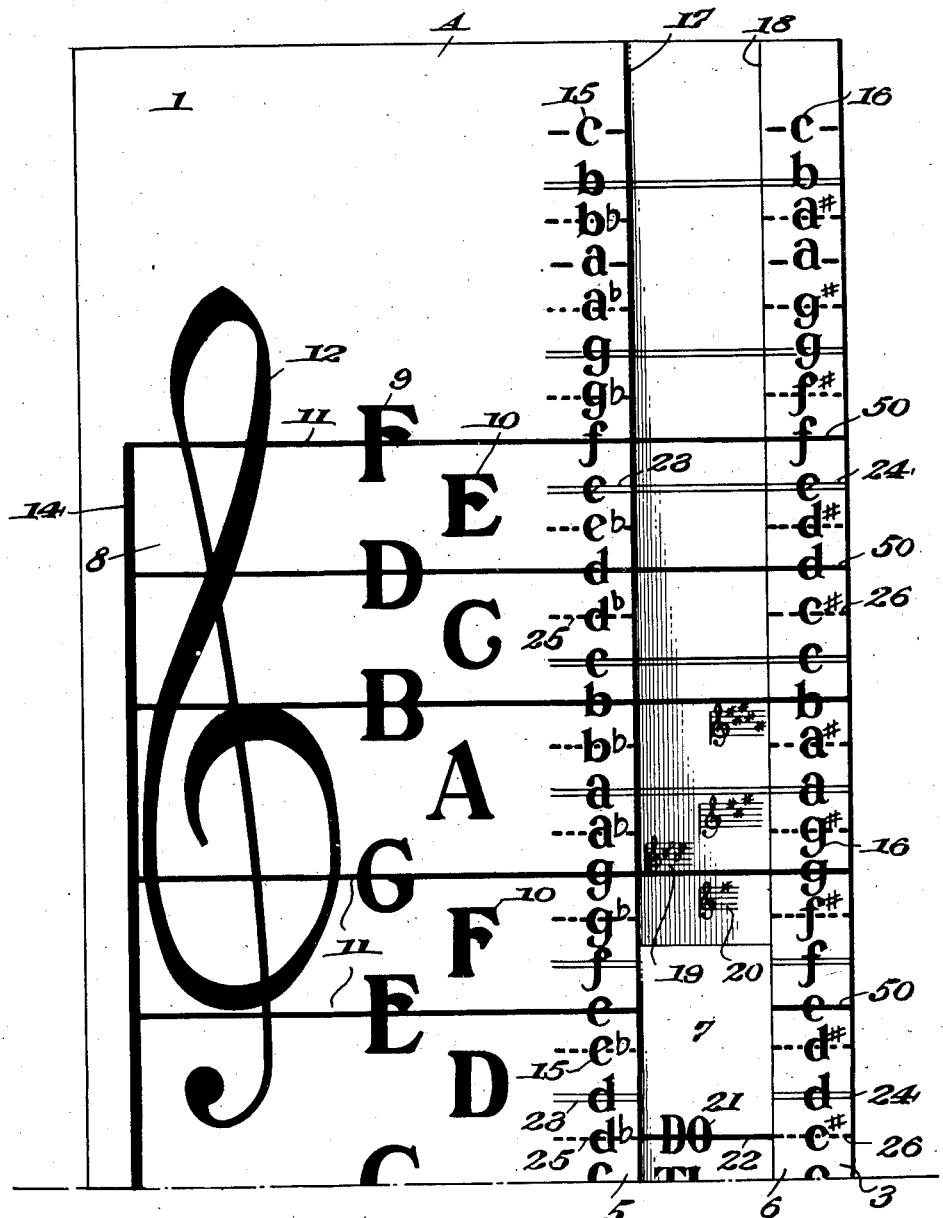

June 21, 1949. W. H. COLEMAN 2,473,988
DEVICE FOR TEACHING MUSIC
Filed Oct. 25, 1946 2 Sheets-Sheet 1

Inventor
William H. Coleman,
By Mason & Hatfield
Attorneys.

Patented June 21, 1949

2,473,988

UNITED STATES PATENT OFFICE 2,473,988

DEVICE FOR TEACHING MUSIC

William H. Coleman, Washington, D. C.

Application October 25, 1946, Serial No. 705,768

8 Claims. (Cl. 84—473)

1

This invention relates to a device for teaching music and is particularly useful to teachers for giving pupils an understanding of certain principles of music notation, whereby the pupil may readily answer questions such as (a) why do the half-steps between 3—4 and 7—8 in the relative scale make necessary key signatures in music (b) why does each position of "DO" make necessary a new key signature, and (c) what is the relationship between the position of "DO" and the number and position of sharps or flats.

An object of the invention is to aid music pupils in acquiring a mastery of the principles of music notation by clarifying the relationship that exists between the key signature of a selection of music and the resulting location of sharps and flats.

Another object of the invention is to provide a device which readily locates the required number and location of flats or sharps for any one of the twelve positions of "DO" on the chromatic scale.

A further object of the invention is to provide a device which includes the representation of a scale with a movable slide member that can be shifted to a plurality of positions, whereby the member may be moved for instance to a position to disclose different keys.

An additional object of the invention is to provide a musical chart in which a scale is represented, there being indicia comprising vertical columns of letters and lines located on opposite sides of a vertical opening, combined with a slide member having indicia comprising a vertical column of letters and lines arranged to convey information to the pupil.

Another object of the invention is to provide a musical chart constructed in accordance with the next proceeding paragraph with which is combined indicia representing key signatures located in vertical columns beneath the slide member, the slide member being provided with an opening whereby the key signature of one of the columns may be uncovered according to the vertical position of said member.

Other objects will appear hereinafter in the specification.

Figures 1A, 2:
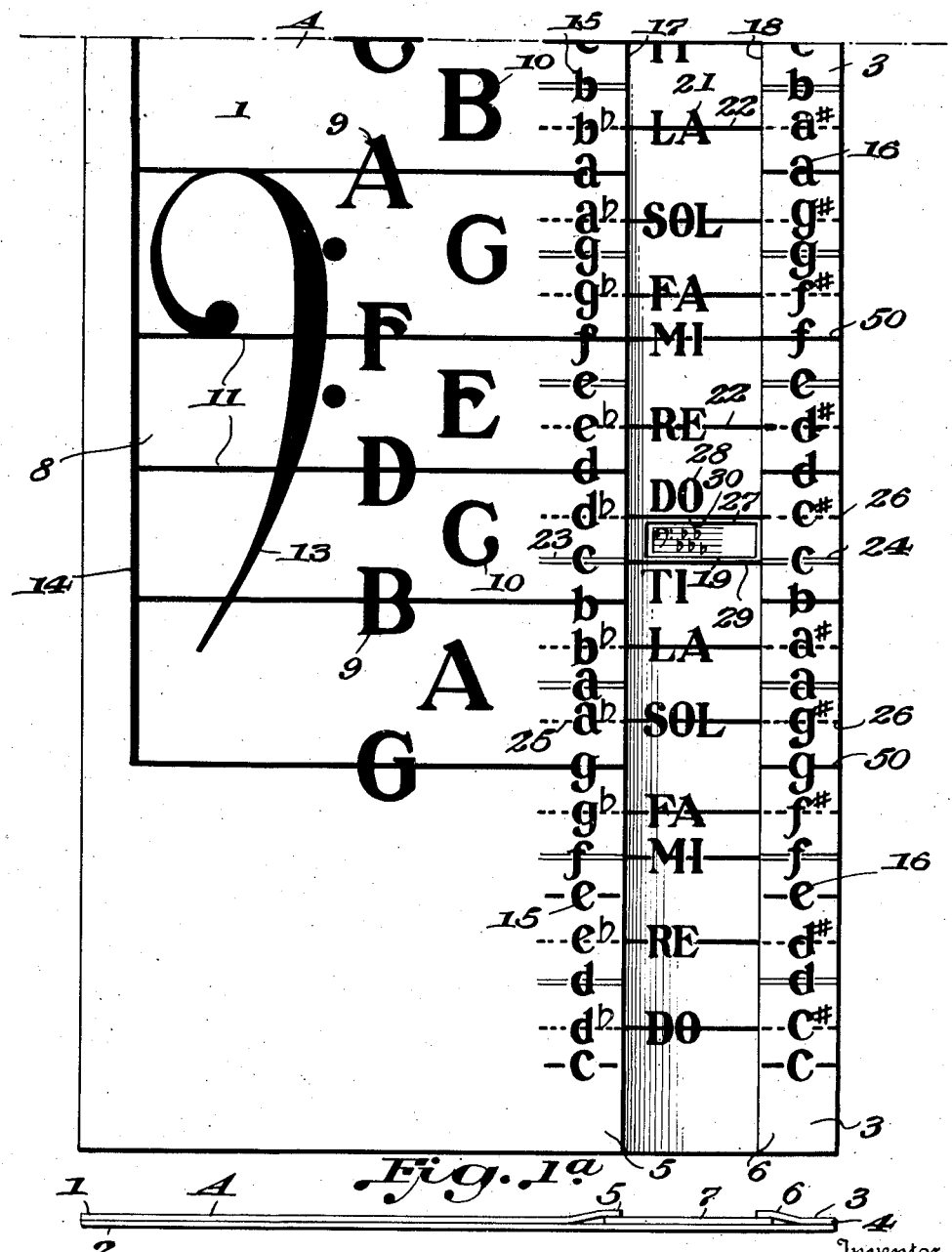

In the drawings:

Figures 1 and 1a disclose a plan view of the musical chart, and

Figure 2 is an end elevation of the musical chart.

In the drawings A represents the chart as a whole. This chart may be conveniently constructed of two layers of plastic material, heavy paper, cardboard, or other suitable material, attached to each other by suitable means, such as adhesively attached to each other, as shown in Figure 2, the upper layer 1 comprises a facing layer and the lower layer 2 comprises a backing layer. The upper layer 1 also comprises a facing strip 3 having one side 4 adhesively attached to the backing layer.

There is a free side 5 adjacent one edge of the facing layer and a free side 6 adjacent one edge of the facing strip 3. The material of which these parts are constructed is stiff enough to retain in position but permit vertical sliding movement of the slide member 7, which latter is slightly wider than the space between the juxtaposed free side edges 17 and 18.

By reference to Figures 1 and 1a it will be noted that the left side of the device represents the commonly used musical staff consisting of spaces 8 and lines 11 which is comprised of the G or treble clef 12 and the F or bass clef 13. On the musical staff lines 11, column 9, and in the spaces 8, column 10, are found the letters C, D, E, F, G, A and B which indicate the notes for these respective positions. The vertical left hand line 14 indicates the left side of the staff.

With the aid of sharps column 16 represents the half-steps of the chromatic scale. With the aid of flats column 15 represents the half-steps in the chromatic scale.

It will be noted that the lines 11 of the musical staff are extended to represent the same note, at the line 50, in the chromatic scale. The indicia 10 indicating notes in the spaces 11 of the musical scale are represented by a double fine line 23 and 24 in the chromatic scale. The necessary half-steps are interpolated where they should be placed and are shown in dotted lines 25 and 26 on the chromatic scale. These dotted lines are identified by flats on one side of the movable scale and by the identical note in sharps on the other side of the scale.

The slide member 7 is located between the chromatic scale in flats and the chromatic scale in sharps. This slide member contains indicia representing the relative scale do re mi fa sol la ti do, with a full step between each except for the half-step between mi fa and ti do. The distances between the notes on the relative scale correspond with the distances on the chromatic scale and the musical staff. When "DO" is, therefore, placed on middle C the other syllables will fall on the natural notes.

The slide member 7 is also provided with an opening or slot 27 which is of such width that it will uncover a key signature in either of the vertical columns of key signature indicia 19 or 20 according to the adjustment of the slide.

The slot 27 is found immediately below "DO" on this relative scale. From this slot the movable relative scale extends upward into the treble clef for an octave and downward into the bass clef for an octave.

It will be noted that mi and fa and ti and do, are the half-steps in their relative scale which make necessary the key signatures in music. For instance, by reference to Figure 1a, the indicia "DO" shown at 28 in the column 21 of the slide may be moved either up or down so that the line on which it stands is a continuation of one of the lines 11. In the event the pupil moves the slide to "g" so that the upper line of the slot is a continuation of the line extending through "g," the signature of which is one sharp, then the pupil will find that the sharp is located on f sharp.

It will be noted that the dotted lines 25, 26 in each of the vertical columns of indicia 15 and 16 form part of the same horizontal line and that the full lines 23, 24 and lines 11, 50 in these columns are also part of the same horizontal line.

Beneath the scale is found a left hand column 19 of musical key signatures, and a right hand vertical column 20 of musical key signatures containing indicia representing the proper key signature so arranged that when the slide is moved so that the line 30 below "DO" is opposite any note on the chromatic scale, the slot will show the proper key signature. It should be noted here that the upper margin of the opening is identical with the line denoting the tonic note "DO."

The slide is provided with indicia 21 comprising a vertically arranged scale and there are a series of lines 22 on this slide which extend through the indicia 21, the lines being constructed and adapted to register with full lines 11 of the staff. The lower line of the slot is indicated by 29.

Shifting the slot upwardly until the upper edge 30 of the slot is in alignment with dotted line "e" flat it will be noted that the key signature in the column 19 is uncovered, this key signature being "e" flat. Therefore the key signature of "e" flat becomes associated with the indicia in the column 15, "e" flat. When "DO" is on "a" flat then the signature is four flats.

When the slide is moved so that the tonic note "DO" is opposite any one of the 12 pitches on the chromatic scale the opening will show the proper key signature.

It will be appreciated that when the column 15 is used only key signatures in indicia column 19 are disclosed, and when column 16 is used only key signatures in indicia column 20 are disclosed. The device therefore serves to clarify to the pupil the relationship that exists between the key signature of music and the resulting location of sharps and flats.

The operation and use of the device is described in connection with the major scale, in which nearly all musical selections are written. The relationship of the minor diatonic scales can be shown by removing the sliding member of the device and substituting a scale having a sequence of whole steps and half steps corresponding to the several forms of the minor scale.

Having thus fully described my invention, it is to be understood that my invention is not to be limited by the specific illustration and description, but is of the full scope of the appended claims.

I claim:

1. The combination of a chart having a plurality of columns determined by spaced horizontal lines with suitable indicia in said columns indicating notes and a column of key signatures located between said columns first named, and a slide member, means for guiding said slide member, said slide member having an opening for disclosing a key signature.

2. The combination of a chart having a plurality of columns determined by spaced horizontal lines with suitable indicia in said columns indicating natural notes and flats in one column and natural notes and sharps in another column, and a pair of columns of key signatures in side by side relationship with each other and with the key signature of one column in echelon relationship with the next above and next below key signature of the other column located between said columns first named, and a slide member, means for guiding said slide member, said slide member having an opening for disclosing a key signature.

3. The combination of a chart having a plurality of vertical columns with suitable indicia in said columns indicating horizontal lines and major and minor keys, a pair of vertical columns of key signatures in side by side relationship with each other and with the key signature of one column in echelon relationship with the next above and next below key signature of the other column located between said columns first named, a slide member, means for guiding said slide member, said slide member having an opening for disclosing a key signature, and a vertical column of indicia on said slide, certain of said last named indicia including a line and a starting note whereby when said line last named is moved into coincidence with one of said first named lines the key signature will be indicated in said opening.

4. The combination of a chart having a plurality of vertical columns with suitable indicia in said columns indicating horizontal lines and natural notes and flats in one column and natural notes and sharps in another column, a column of key signatures located between said columns first named, a slide member, means for guiding said slide member, said slide member having an opening for disclosing a key signature, and a vertical column of indicia on said slide, certain of said last named indicia including a line and a starting note whereby when said line last named is moved into coincidence with one of said first named lines the key signature will be indicated in said opening.

5. The combination of a chart having a plurality of vertical columns of indicia indicating natural notes, sharps and flats, said sharps and natural notes being located in one column and flats and natural notes being located in the other column, a plurality of columns of indicia comprising key signatures located between said first named columns, said plurality of columns being in side by side relationship with each other, each key signature being in echelon relationship with the next above key signature in the adjacent column, and a slide, said slide having an opening constructed and adapted to disclose a key signature of either key signature column.

6. The combination of a chart having a plurality of vertical columns of indicia indicating natural notes, sharps and flats, said sharps and natural notes being located in one column and flats and natural notes being located in the other column, a plurality of columns of indicia comprising key signatures located between said first named columns, and a slide, said slide having an opening constructed and adapted to disclose a key signature of either key signature column, a straight line on said slide below said opening and a plurality of lines on said chart, adapted to form a continuation of said line on said slide when it is moved to any one of a plurality of positions.

7. The combination of a chart having a plurality of vertical columns of indicia indicating natural notes, sharps and flats, said sharps and natural notes being located in one column and flats and natural notes being located in the other column, a plurality of columns of indicia comprising key signatures located between said first named columns, and a slide, said slide having an opening constructed and adapted to disclose a key signature of either key signature column, at least one straight line on said slide above said opening and a plurality of lines on said chart, adapted to form a continuation of said line on said slide when it is moved to any one of a plurality of positions.

8. The combination of a chart having a plurality of vertical columns of indicia indicating natural notes, sharps and flats, said sharps and natural notes being located in one column and flats and natural notes being located in the other column, a plurality of columns of indicia comprising key signatures located between said first named columns, and a slide, said slide having an opening constructed and adapted to disclose a key signature of either key signature column, said opening having a line above and a line below said opening on said slide and a plurality of lines on said columns adapted to form continuations of the lines on said slide when said slide is moved into any one of a plurality of positions of adjustment.

WILLIAM H. COLEMAN.

REFERENCES CITED

The following references are of record in the file of this patent:

UNITED STATES PATENTS

| Number | Name | Date |
| --- | --- | --- |
| 134,001 | Ober | Dec. 17, 1872 |
| 367,156 | Nix | July 26, 1887 |
| 2,079,920 | Orzada | May 11, 1937 |